3,470,106
PROCESSING OF HALOPHOSPHATE PHOSPHOR

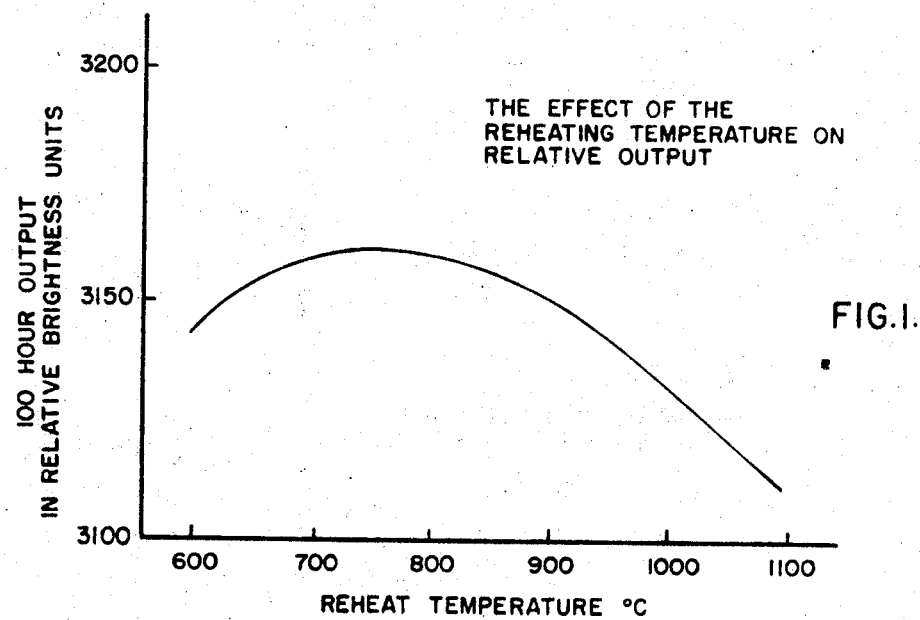
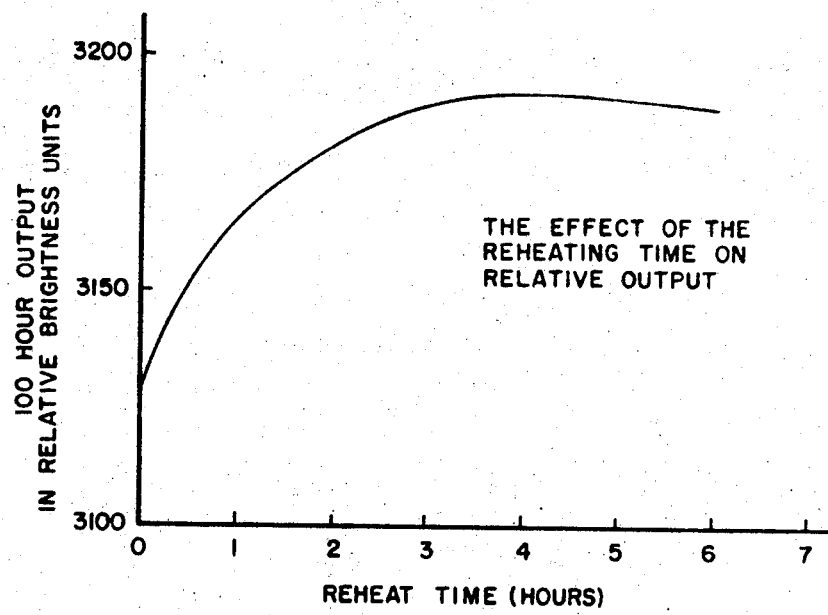

Frank M. Vodoklys, Wayne, and Gilbert P. Mortensen, Livingston, N.J., assignors to Westinghouse Electric Corporation, Pittsburgh, Pa., a corporation of Pennsylvania
Filed Feb. 23, 1967, Ser. No. 618,024
Int. Cl. C09k 1/04
U.S. Cl. 252—301.4 — 4 Claims

ABSTRACT OF THE DISCLOSURE

Halophosphate phosphor is reheated after initial preparation with an addition of ammonium chloride. The reheating is carried out in an inert atmosphere at from 600–940° C. for at least one-half hour. The luminous output of the discharge lamp incorporating the phosphor is thereby improved.

BACKGROUND OF THE INVENTION

The invention relates to a method of processing phosphors, and particularly halophosphates.

The phosphor most generally used today for fluorescent lamps continues to be a halophosphate and such phosphors are described in U.S. Patent No. 2,788,733, dated Nov. 20, 1949. The luminous output of such phosphors have continued to be increased by improved processing methods.

The production of phosphors in large batches in furnaces introduces problems affecting overall efficiency. The firing temperature is generally high enough to volatize some of the phosphor constituents or to cause by-products to be volatized. As the phosphor is cooled some of these gases remaining in the furnace may condense on the phosphor surface and impair its efficiency.

Simple reheating of a halophosphate at from 700–1150° C. for about one hour in an inert atmosphere is taught by King et al. in British Patent 1,018,982 dated Feb. 2, 1965. In the preparation of halophosphate phosphors, it has sometimes been the practice to include ammonium chloride as one of the raw-mix constituents, in order to supply the chlorine constituent of the phosphor.

SUMMARY OF THE INVENTION

It is an object of this invention to provide a method for processing prepared calcium halophosphate phosphor in order to improve the performance of a discharge lamp which incorporates such phosphor.

The above-mentioned object and others that will become apparent as the description proceeds are accomplished by mechanically reducing the initially prepared phosphor to finely divided status and reheating the phosphor in a furnace at a temperature of from 600–940° C. for at least one-half hour in an inert atmosphere. The readily volatizable compound, $NH_4Cl$, is premixed with the phosphor before reheating. It is theorized that the additive readily reacts with compounds not assimilated into the phosphor to form volatizable compounds which are driven off upon heating.

BRIEF DESCRIPTION OF THE DRAWINGS

FIGURE 1 is a graph demonstrating the effect of the reheat temperature on the 100 hour output in relative brightness units for a 40 watt discharge lamp incorporating the prepared halophosphate with 0.5% by weight of ammonium chloride added and heated for one hour at the indicated temperatures.

FIG. 2 is a graph demonstrating the effect of the reheat time on the 100 hour output in relative brightness units for a 40 watt discharge lamp incorporating the prepared halophosphate with 0.5% by weight of ammonium chloride added and reheated at 800° C.

DESCRIPTION OF THE PREFERRED EMBODIMENTS

The halophosphate phosphor that is used in the practice of the present invention follows the basic halophosphate formulation as outlined in the aforementioned Patent 2,488,733. As an example, the raw mix here consists of 2730 grams $CaHPO_4$, 809 grams $CaCO_3$, 115 grams $Sb_2O_3$, 69 grams of $MnCO_3$ 244 grams of $CaF_2$, 70 grams of $CdCO_3$, 105 grams of $NH_4Cl$. The raw mix is fired in nitrogen which removes most of the gases evolved during the firing. While $CdCO_3$ is used in the present example, the phosphor can be prapared with $SrCO_3$, or additional $CaCO_3$ substituted for the $CdCO_3$. While antimony and manganese are used as activators in the phosphor used in the example, a blue emitting phosphor can be prepared by using antimony as the sole activator.

The fired phosphor is in the form of a friable cake which is hammer milled to achieve a desired average particle size, such as six microns.

The readily volatizable ammonium chloride additive is mixed with the finely divided phosphor before reheating. The ammonium chloride can be added as a solid to be milled with the phosphor or can be sprayed onto the phosphor as an aqueous solution. The ammonium chloride additive is used in an amount of from 0.3% to 1.3% by weight of the phosphor. The preferred additive is 0.5% by weight of the phosphor.

The finely divided phosphor is then heated in an inert atmosphere, such as argon or nitrogen at from 600 to 940° C. for at least one-half hour. The greatest gain in luminous output is had by firing at from 700° C. to 800° C. for about four hours in a nitrogen atmosphere.

The effect of varying the reheating temperature on output is shown in FIG. 1, wherein the 100-hour output for 40 watt fluorescent lamps, in relative brightness units, is plotted vs. reheating temperature. In order to achieve a substantial increase in lamp brightness, the phosphor should be reheated at a temperature of from 600° C. to 940° C. The preferred reheating temperature is from 700° C. to 800° C.

The effect of varying the reheating time on output is shown in FIG. 2, wherein the 100-hour output for 40 watt fluorescent lamps, in relative brightness units, is plotted vs. reheating time at a preferred reheating temperature of 800° C. In order to achieve a significant increase in output, the reheating should be conducted for a period of at least one-half hour, and preferably, the reheating should be conducted for about four hours. With a reheating temperature of more than about six hours, the processing becomes impractical from a production standpoint, although longer reheating times could be used if desired.

In the following data, the halophosphate is prepared as indicated above. Table I shows the gain in luminous output achieved by reheating with the additive. The reheating is at 800° C. for one hour in a nitrogen atmosphere.

TABLE I

| 100 hour lumen gain: | Percent by weight $NH_4Cl$ Added |
|---|---|
| 46 | 0.5 |
| 34 | 0.7 |
| 32 | 1.0 |

Table II shows the results when a separate batch of reheated halophosphate is life tested after heating at 800° C. for one hour with 0.5% by weight of ammonium chloride added. It is seen that the increased lumen output is maintained in a life test of up to at least 1200 hours operating time.

TABLE II.—LIFE TESTING OF PROCESSED PHOSPHOR

| Processing gain in lumens: | Hours |
|---|---|
| 53 | 0 |
| 33 | 100 |
| 18 | 600 |
| 43 | 1200 |

This reheating temperature is not high enough to cause appreciable agglomeration of the phosphor particles and only a ball milling is required after cooling. The phosphor is then washed in a 0.1 molar solution of nitric acid and is ready for use after drying.

What is claimed is:

1. The method of processing phosphor principally comprising calcium halophosphate activated by antimony or antimony plus manganese in order to improve the performance of the discharge lamp which incorporates such phosphor, which method comprises:
   (a) after the phosphor is initially prepared by firing the raw-mix constituents under predetermined conditions, mechanically reducing the phosphor to finely divided status;
   (b) substantially uniformly distributing throughout said phosphor from 0.3% to 1.3% by weight of ammonium chloride; and
   (c) heating said phosphor in an inert atmosphere furnace heated to a temperature of from 600° C. to 940° C. for at least one-half hour.

2. The method as specified in claim 1, wherein said phosphor is initially prepared with a small amount of cadmium compound included in the raw-mix.

3. The method as specified in claim 1, wherein said ammonium chloride is added to said initially prepared phosphor in an amount of about 0.5% by weight of said phosphor, and said phosphor is thereafter fired in said inert atmosphere at a temperature of from 700–800° C. for a period of about four hours.

4. The method as specified in claim 3, wherein said inert atmosphere is a nitrogen atmosphere.

References Cited

UNITED STATES PATENTS

| | | | |
|---|---|---|---|
| 2,544,663 | 3/1951 | Fortney et al. | 252—301.4 |
| 3,047,512 | 7/1962 | Martyny | 252—301.4 |
| 3,416,019 | 12/1968 | Kaduk | 252—301.6 |

TOBIAS E. LEVOW, Primary Examiner

R. D. EDMONDS, Assistant Examiner